US009225715B2

(12) United States Patent
Bohrer et al.

(10) Patent No.: US 9,225,715 B2
(45) Date of Patent: Dec. 29, 2015

(54) SECURELY ASSOCIATING AN APPLICATION WITH A WELL-KNOWN ENTITY

(71) Applicant: GLOBALFOUNDRIES INC., Grand Cayman (KY)

(72) Inventors: Patrick J. Bohrer, Cedar Park, TX (US); Colin K. Dixon, Austin, TX (US); Jan S. Rellermeyer, Austin, TX (US)

(73) Assignee: GlobalFoundries U.S. 2 LLC, Hopewell Junction, NY (US)

( * ) Notice: Subject to any disclaimer, the term of this patent is extended or adjusted under 35 U.S.C. 154(b) by 0 days.

(21) Appl. No.: 14/080,157

(22) Filed: Nov. 14, 2013

(65) Prior Publication Data
US 2015/0134951 A1 May 14, 2015

(51) Int. Cl.
*H04L 29/06* (2006.01)
*G06F 15/16* (2006.01)

(52) U.S. Cl.
CPC .................... *H04L 63/0823* (2013.01)

(58) Field of Classification Search
CPC ............................. H04L 63/0823; G06F 7/588
USPC ................ 713/165, 175, 156; 726/6; 708/250
See application file for complete search history.

(56) References Cited

U.S. PATENT DOCUMENTS

| | | | | | |
|---|---|---|---|---|---|
| 5,841,870 | A | * | 11/1998 | Fieres | ..................... G06F 21/57 713/156 |
| 5,924,094 | A | * | 7/1999 | Sutter | ............... G06F 17/30575 1/1 |
| 6,446,092 | B1 | * | 9/2002 | Sutter | ............... G06F 17/30578 1/1 |
| 6,539,093 | B1 | * | 3/2003 | Asad | ................. G06Q 20/3674 380/279 |
| 6,609,199 | B1 | | 8/2003 | DeTreville | |
| 7,051,200 | B1 | * | 5/2006 | Manferdelli | ............ G06F 21/10 705/57 |
| 7,788,730 | B2 | * | 8/2010 | Dean | ........................ G06F 21/52 713/156 |
| 7,802,294 | B2 | * | 9/2010 | Perlin | ................. G06F 21/6218 713/172 |
| 7,823,192 | B1 | * | 10/2010 | Fultz | ....................... G06F 21/33 709/225 |

(Continued)

FOREIGN PATENT DOCUMENTS

EP          2 403 210 B1     2/2013

OTHER PUBLICATIONS

Armando, Alessandro et al., "Formal Analysis of SAML 2.0 Web Browser Single Sign-On: Breaking the SAML-based Single Sign-On for Google Apps", FMSE'08, Alexandria, Virginia, Oct. 27, 2008, 9 pages.

(Continued)

*Primary Examiner* — Abu Sholeman
(74) *Attorney, Agent, or Firm* — Stephen J. Walder, Jr.; Francis Lammes

(57) ABSTRACT

A mechanism is provided for securely associating an application with a well-known entity. A determination is made as to whether an identified application has an associated certificate. Responsive to the identified application having the associated certificate, a determination is made as to whether the associated certificate is issued from a certificate authority associated with the well-known entity trusted by a user of the identified application, where the certificate authority is in a separate domain from an application marketplace where the application was obtained. Responsive to the associated certificate being issued by the certificate authority associated with the well-known entity trusted by the user of the identified application, an indication is provided to the user that the application is trusted in context to interactions with the certificate authority.

19 Claims, 6 Drawing Sheets

(56) References Cited

U.S. PATENT DOCUMENTS

| | | | |
|---|---|---|---|
| 8,010,996 B2 | 8/2011 | Cline et al. | |
| 8,051,299 B2* | 11/2011 | Saunier | G06F 21/51 713/185 |
| 8,079,087 B1 | 12/2011 | Spies et al. | |
| 8,302,153 B1* | 10/2012 | Garrity | G06F 21/33 713/182 |
| 8,826,005 B1* | 9/2014 | Brichford | G06F 21/51 713/156 |
| 2003/0097579 A1* | 5/2003 | England | G06F 21/53 713/193 |
| 2003/0126085 A1 | 7/2003 | Srinivasan | |
| 2003/0237004 A1* | 12/2003 | Okamura | H04L 63/0823 726/15 |
| 2004/0039672 A1* | 2/2004 | Zivic | G06Q 40/06 705/36 R |
| 2005/0021969 A1* | 1/2005 | Williams | H04L 9/3268 713/176 |
| 2006/0277417 A1* | 12/2006 | Oikawa | G06F 21/31 713/193 |
| 2007/0058812 A1* | 3/2007 | Ali | G06F 1/14 380/274 |
| 2007/0186112 A1* | 8/2007 | Perlin | G06F 21/31 713/182 |
| 2007/0192590 A1* | 8/2007 | Pomerantz | H04L 63/0823 713/157 |
| 2007/0234044 A1* | 10/2007 | Kudo | H04L 9/3263 713/156 |
| 2008/0005794 A1* | 1/2008 | Inoue | G06F 21/56 726/22 |
| 2008/0104207 A1* | 5/2008 | Pulkkinen | H04L 41/0803 709/220 |
| 2008/0148298 A1* | 6/2008 | Chatterjee | G06F 21/54 719/328 |
| 2009/0205037 A1* | 8/2009 | Asakura | G06F 21/629 726/10 |
| 2009/0210702 A1* | 8/2009 | Welingkar | H04L 9/321 713/156 |
| 2009/0313468 A1* | 12/2009 | Hazlewood | H04L 63/0823 713/156 |
| 2010/0042504 A1* | 2/2010 | Shenfield | G06Q 30/02 705/14.73 |
| 2010/0250946 A1* | 9/2010 | Korte | H04L 63/0823 713/175 |
| 2011/0145926 A1* | 6/2011 | Dalcher | G06F 11/3466 726/26 |
| 2011/0179477 A1* | 7/2011 | Starnes | G06F 21/52 726/9 |
| 2011/0231443 A1* | 9/2011 | Hannel | H04L 63/105 707/776 |
| 2011/0238999 A1* | 9/2011 | Lee | H04L 9/3247 713/178 |
| 2011/0289560 A1* | 11/2011 | Laitinen | H04L 9/3273 726/4 |
| 2011/0307714 A1* | 12/2011 | Comrie | G06F 21/6209 713/189 |
| 2012/0159578 A1* | 6/2012 | Chawla | G06F 21/53 726/4 |
| 2012/0221850 A1* | 8/2012 | Struik | H04L 9/0844 713/156 |
| 2012/0227114 A1* | 9/2012 | Okuyama | H04L 63/102 726/29 |
| 2013/0030966 A1 | 1/2013 | Aidasani et al. | |
| 2013/0047093 A1 | 2/2013 | Reuschel et al. | |
| 2013/0054454 A1 | 2/2013 | Purves et al. | |
| 2013/0054962 A1* | 2/2013 | Chawla | H04L 9/321 713/156 |
| 2013/0055347 A1* | 2/2013 | Chawla | H04W 12/08 726/3 |
| 2013/0132717 A1* | 5/2013 | Brand | H04L 9/0825 713/156 |
| 2013/0219173 A1* | 8/2013 | Ho | G06F 21/33 713/157 |
| 2013/0254535 A1* | 9/2013 | Akehurst | H04L 29/06 713/158 |
| 2014/0013105 A1* | 1/2014 | Niemeyer | G06F 21/33 713/156 |
| 2014/0013409 A1* | 1/2014 | Halageri | H04L 63/0815 726/8 |
| 2014/0258710 A1* | 9/2014 | Brand | H04W 12/06 713/156 |
| 2014/0289511 A1* | 9/2014 | Tuch | H04L 63/0823 713/156 |
| 2014/0325586 A1* | 10/2014 | Halliday | H04W 12/12 726/1 |
| 2014/0327779 A1* | 11/2014 | Eronen | H04N 7/181 348/159 |
| 2015/0186664 A1* | 7/2015 | Nicolaou | G06F 21/6209 726/30 |

OTHER PUBLICATIONS

Fahl, Sascha et al., "Why Eve and Mallory Love Android: An Analysis of Android SSL (In)Security", CCS'12, Raleigh, North Carolina, Oct. 16-18, 2012, pp. 50-61.

Georgiev, Martin et al., "The most Dangerous Code in the World: Validating SSL Certificates in Non-Browser Software", CCS'12, Raleigh, North Carolina, Oct. 16-18, 2012, 12 pages.

Mainkar, Varsha, "Performance Implications of Security Protocols", 5th INFORMS Telecom Conference, Boca Raton, Mar. 7, 2000, 18 pages.

* cited by examiner

SECURELY ASSOCIATING AN APPLICATION WITH A WELL-KNOWN ENTITY

BACKGROUND

The present application relates generally to an improved data processing apparatus and method and more specifically to mechanisms for securely associating an application with a well-known entity.

Computer software that causes a computer to perform useful tasks is commonly referred to as a software application, a program, an application, or just an app. Currently, many users obtain new applications through application distribution platforms or marketplaces, which are typically operated by the owner of an operating system on which the application will be executed. Although, there are other application distribution platforms or marketplaces that provide applications for numerous different operating systems. In either of these platforms or marketplaces, numerous applications are available for users either at no cost or at a minimal cost.

SUMMARY

In one illustrative embodiment, a method, in a data processing system, is provided for securely associating an application with a well-known entity. The illustrative embodiment determines whether an identified application has an associated certificate. The illustrative embodiment determines whether the associated certificate is issued from a certificate authority associated with the well-known entity trusted by a user of the identified application in response to the identified application having the associated certificate. In the illustrative embodiment, the certificate authority is in a separate domain from an application marketplace where the application was obtained. The illustrative embodiment provides an indication to the user that the application is trusted in context to interactions with the certificate authority in response to the associated certificate being issued by the certificate authority associated with the well-known entity trusted by the user of the identified application.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Generally, application marketplaces request a user's credentials (for the marketplace) to download an application, whether the application has a purchase price or is free. Further, once an application is downloaded, many applications request user's credentials, which may be the same credentials as for the marketplace or credentials for some other service, at some point to personalize the application or to give access to a service. However, many of the applications that are downloaded comprise ambiguous names from ambiguously named publishers. Therefore, users may find difficulty in determining whether they should trust their credentials to the application. Further, even if users do provide their credentials to the application, there may be concern about whether to allow the application to handle certain uniform resource locators (URLs).

Thus, the illustrative embodiments provide for securely associating an application with a well-known entity, such as by validating that the application is either from or endorsed by a well-known entity using certificate technology. The illustrative embodiments detect whether an application has an associated certificate, such as a Secure Sockets Layer (SSL) certificate, Unified Communications (UC) certificate, or the like. If the application comprises a certificate, the illustrative embodiments verify whether the certificate is valid via a certificate authority associated with a well-known entity identified by the certificate. The certificate authority and/or well-known entity being in a separate domain from the marketplace where the application was obtained. For example, the certificate authority might be predominantly associated with HTTP/HTTPS traffic, which may be in a different domain than certificate authorities likely used to verify applications through the application marketplace normally. If the certificate is verified by the well-known entity and the well-known entity is a trusted entity, the illustrative embodiments provide an indication to the application user that the application is either from or endorsed by the trusted entity and, thus, the application may be trusted to handle any URLs as though the application was the trusted entity. Note that verification of the certificate includes, but is not limited to, ensuring that the certificate is associated with the application (possibly by first verifying a cryptographic digest of the application) and that the certificate is signed by or otherwise cryptographically associated with the certificate authority as would be known to someone skilled in the art.

Figure 1:
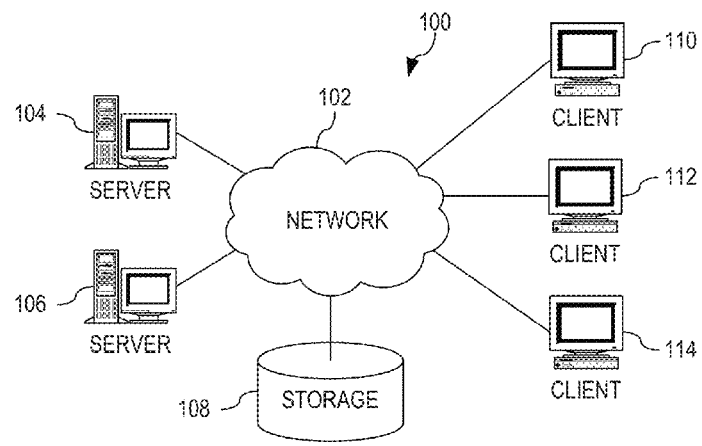
FIG. 1 is an example diagram of a distributed data processing system in which aspects of the illustrative embodiments may be implemented.
Figure 2:
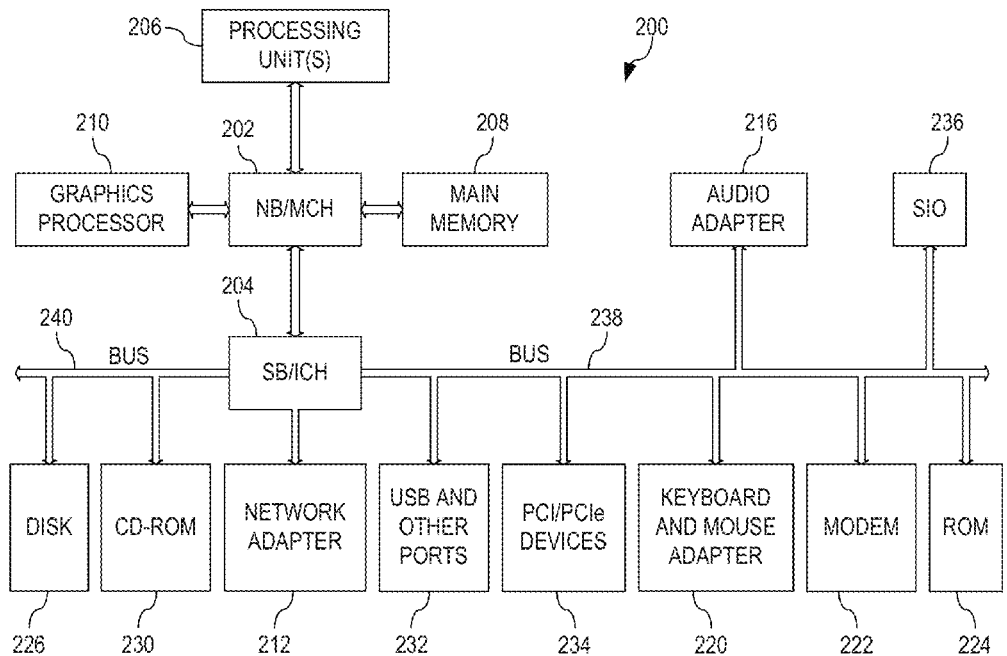
FIG. 2 is a block diagram of an example data processing system in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wires, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, mobile devices (e.g., smartphones) or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
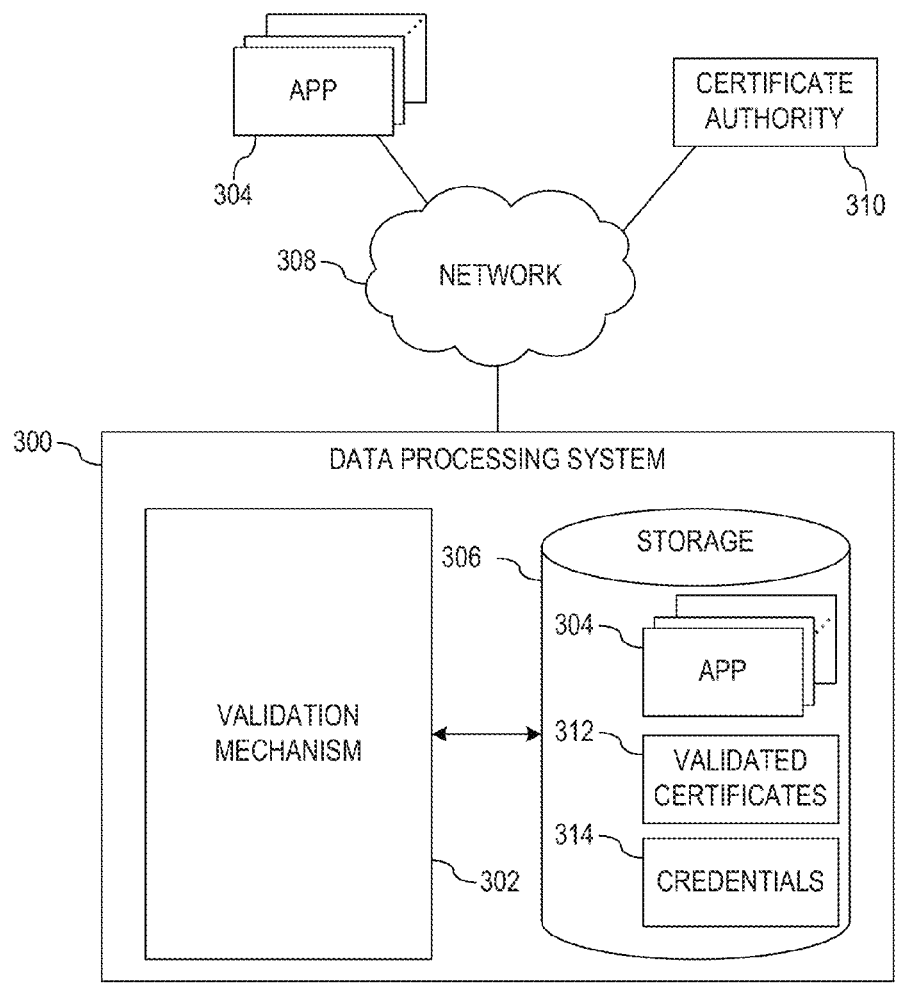
FIG. 3 depicts a mechanism for validating that an application is from or endorsed by a well-known entity in accordance with an illustrative embodiment.

Again, applications either downloaded on or intended to be downloaded to a data processing system, such as data processing system 200 of FIG. 2, may comprise ambiguous names from ambiguously named entities. In order to verify whether an application with an ambiguous name from ambiguously named entity may be trusted to receive a user's credentials and personal information, FIG. 3 depicts a mechanism for validating that an application is from or endorsed by a well-known entity in accordance with an illustrative embodiment. Data processing system 300 comprises validation mechanism 302 that validates one or more applications 304 either stored in storage 306 of data processing system 300 or intended to be downloaded via network 308 to storage 306 of data processing system 300. Upon an identification of application 304 by a user of data processing system 300, validation mechanism 302 determines whether identified application 304 has an associated certificate, such as a Secure Sockets Layer (SSL) certificate, Unified Communications (UC) certificate, or the like.

If validation mechanism 302 determines that identified application 304 has an associated certificate, validation mechanism 302 performs a verification process with certificate authority 310 identified by the certificate. Certificate authority 310 is associated with a well-known entity that is in a separate domain from the marketplace where application 304 was downloaded/obtained. That is, validation mechanism 302 sends the certificate associated with the identified application 304 to certificate authority 310 for validation or conducts a cryptographic exchange establishing that certificate authority 310 in fact issued the certificate associated with application 304. Note that the validation that certificate authority 310 issued the certificate for application 304 may also be performed locally if some form of identification of certificate authority 310, e.g., a public key, has been previously stored. Certificate authority 310 may be associated with, for example, a domain, application marketplace, operating system developer, or the like, with which the identified application 304 claims to be associated based on the certificate associated with the identified application 304. Based on the provided certificate, certificate authority 310 may verify that the certificate is authentic indicating that the well-known entity associated with certificate authority 310 issued the certificate associated with the identified application 304 or indicate that the certificate is fraudulent. Note that certificate authority 310 may also need to be verified with another certificate authority and so on until reaching a "root" certificate author T, which is trusted as will be understood by one skilled in the art. This may cause the chain of trust, i.e., this list of certificate authorities, in the application to transfer into an existing domain, e.g., HTTPS/SSL certificates, for which there are already well-known chains of trust thus bootstrapping trust for applications to an external domain. In some cases, e.g., HTTPS/SSL certificates, this may also provide an identity, which a human may verify, e.g., a well known domain name such as amazon.com.

Based on the response from certificate authority 310, validation mechanism 302 may provide, if the response indicates that the certificate is valid, an indication to the user of identified application 304 that identified application 304 may be trusted in context as well as an indication of the certificate authority 310. Trusted in context refers to entrusting with credentials, URL handling, or the like, to other applications, Websites, or the like, where the user trusts the well-known entity associated with certificate authority 310. That is, application 304, once validated, is not blanket "trusted," but trusted in a certain context. Namely, application 304 is trusted with relation to the trusted entity associated with certificate authority 310. Therefore, for example, if the trusted entity is amazon.com, application 304 may be trusted to handle credentials for the trusted entity, such as a username and password for amazon.com, to handle certain URLs at amazon.com, or the like. Additionally, if the response from certificate authority 310 indicates that the certificate is fraudulent, validation mechanism 302 may provide an indication of fraudulence of the associated certificate to the user. The indication provided to the user by validation mechanism 302 may be in the form of a notification, pop-up, integration onto a display with the identified application 304, or the like.

In accordance with an additional embodiment, if the certificate is valid and if the identified application 304 is downloaded by the user, validation mechanism 302 may store the validation of the certificate 312 to use in allowing the application 304 to handle any URLs including URLs that might be associated with the trusted entity associated with certificate authority 310 which issued certificate 312. In accordance with another embodiment, if the certificate is valid and if the identified application 304 is downloaded by the user, validation mechanism 302 may store any user credentials 314 provided to the identified application for utilization in connecting to and interacting with either certificate authority 310 or external entities associated with certificate authority 310.

Figure 4A:
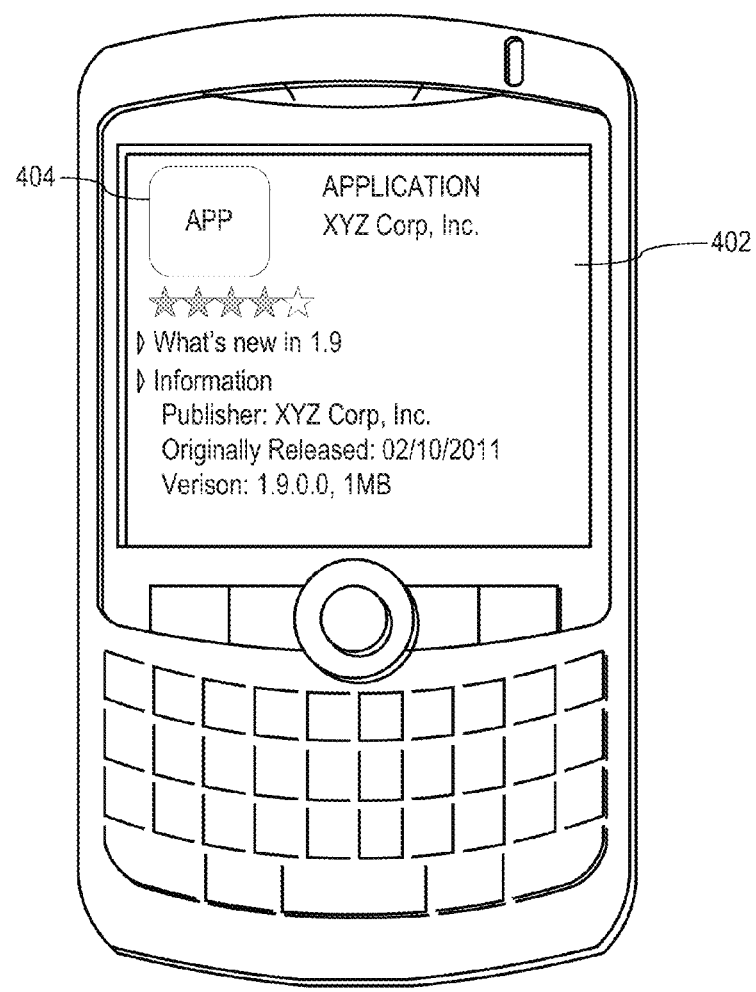
FIGS. 4A-4C provide examples of devices displaying information associated with an application to a user in accordance with the illustrative embodiments.
Figure 4B:
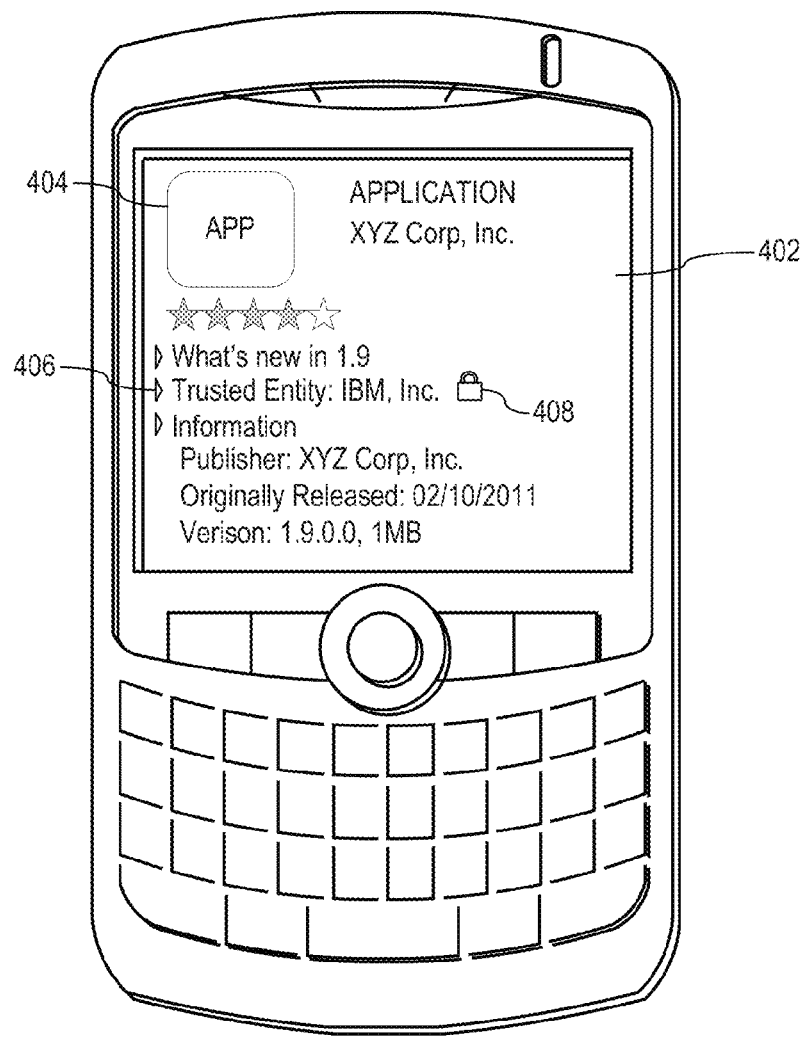
Figure 4C:
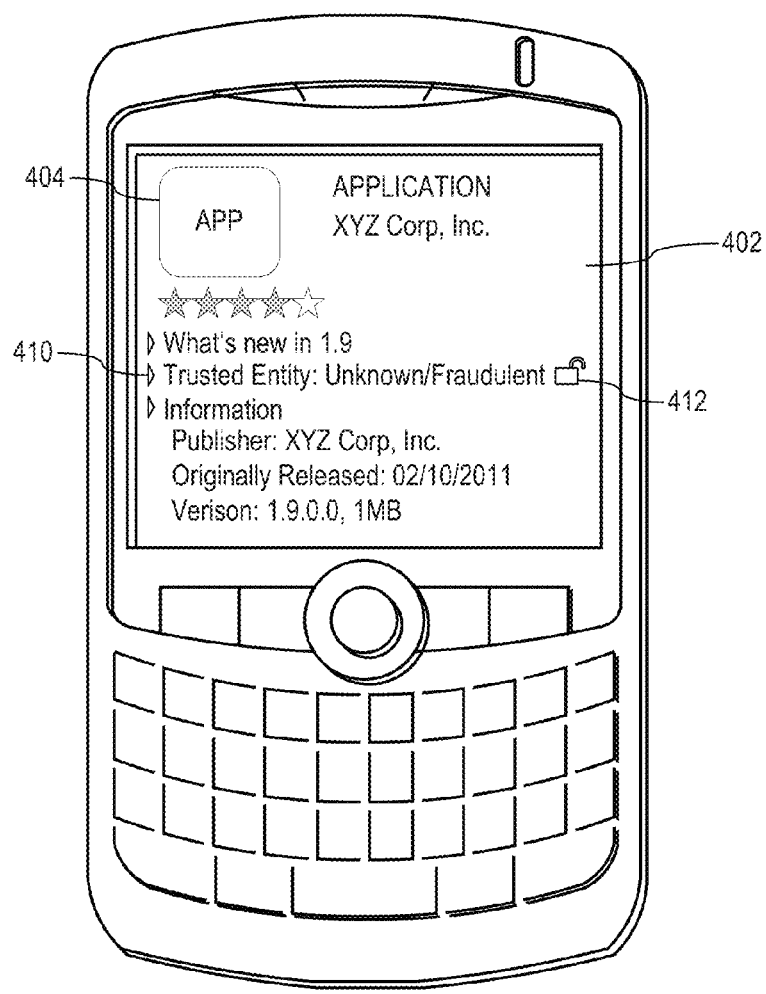

FIGS. 4A-4C provide examples of devices displaying information associated with an application to a user in accordance with the illustrative embodiments. FIG. 4A depicts application specific information 402 associated with user-identified application 404. As is depicted, the application is published by XYZ Corp, Inc., which, to a user, may be ambiguous. In accordance with the mechanisms of the illustrative embodiments, FIG. 4B depicts additional information 406 added to application specific information 402. Additional information 406 is a trusted entity field that indicates a name of the trusted entity that is certifying user-identified application 404 as well as visual indication that the application is trusted or secure by means of locked lock icon 408. In accordance with the mechanisms of the illustrative embodiments, FIG. 4C depicts a further indication of additional information 410 added to application specific information 402. Additional information 410 is also a well-known entity field but, in this instance, additional information 410 indicates that the well-known entity that is supposedly certifying user-identified application 404 is unknown or fraudulent as well as visual indication that the application is not to be trusted or is not secure by means of unlocked lock icon 412.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) Or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider).

Aspects of the present invention are described below with reference to flowchart illustrations and/or block diagrams of methods, apparatus (systems and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5:
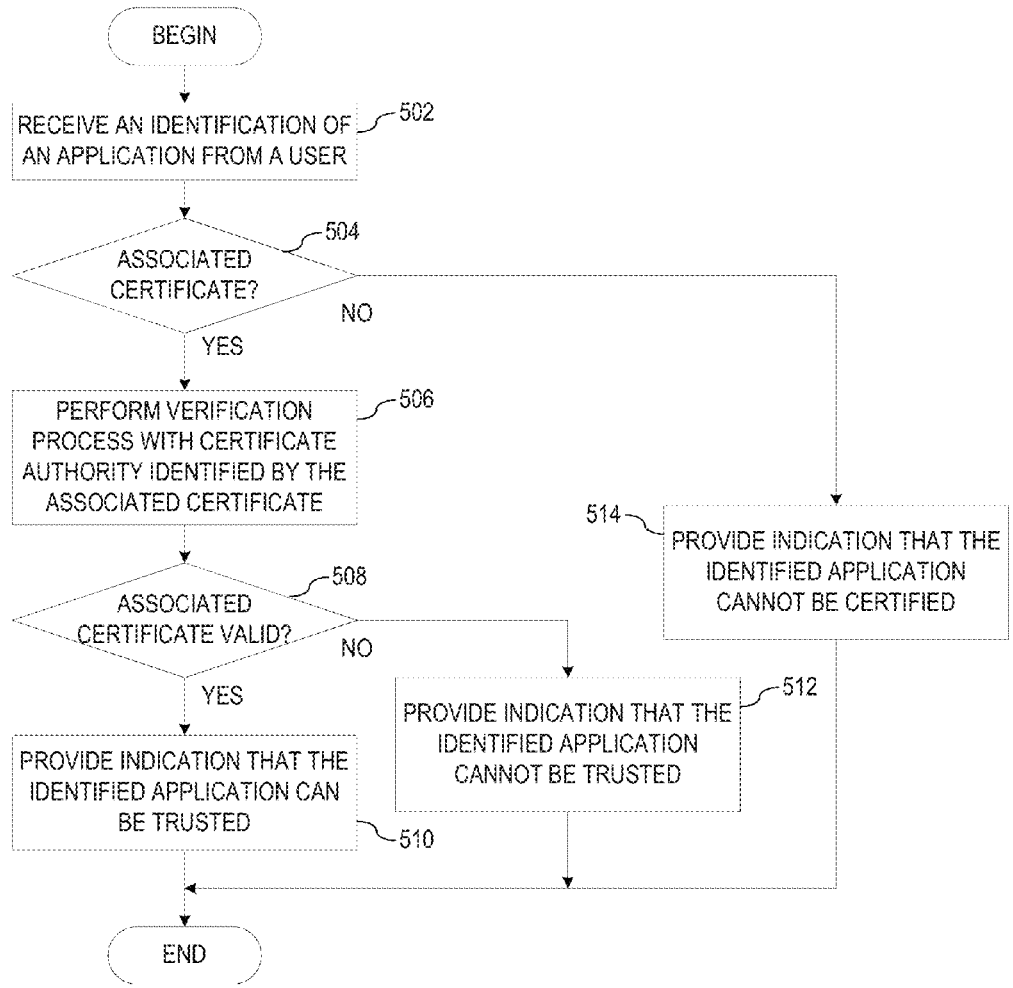
FIG. 5 depicts a flowchart of the operation performed by a validation mechanism in securely associating an application with a well-known entity in accordance with an illustrative embodiment.

FIG. 5 depicts a flowchart of the operation performed by a validation mechanism in securely associating an application with a well-known entity in accordance with an illustrative embodiment. As the operation begins, the validation mechanism running on the data processing system receives an identification of an application from a user (step 502). The validation mechanism determines whether the identified application has an associated certificate (step 504). If at step 504 the application has an associated certificate, the validation mechanism performs a verification process with a certificate authority identified by the associated certificate (step 506). This validation may be by sending the certificate associated with the identified application to the certificate authority for validation, by conducting a cryptographic exchange establishing that the certificate authority in fact issued the certificate associated with the application, or locally if enough information is stored to verify that the certificate authority issued the certificate, e.g., a public key. Again, the certificate authority is in a separate domain from the marketplace where the application was obtained.

Based on a response from the certificate authority, the validation mechanism determines whether the certificate associated with the application is valid (step 508). If at step 508 the response from the certificate authority indicates that the certificate is valid, the validation mechanism provides an indication to the user that the identified application may be trusted in context as well as an indication of the associated well-known entity (step 510), with the operation ending thereafter. Trusted in context refers to entrusting with credentials, URL handling, or the like, to other applications, Websites, or the like, where the user trusts the well-known entity associated with the certificate authority. That is, the application, once validated, is not blanket "trusted", but trusted in a certain context. Namely, the application is trusted with relation to the trusted entity associated with the certificate authority. Therefore, for example, if the trusted entity is amazon.com, the application may be trusted to handle credentials for the trusted entity, such as a username and password for amazon.com, to handle certain URLs at amazon.com, or the like.

If at step 508 the response from the certificate authority indicates that the certificate is fraudulent, the validation mechanism provides an indication to the user that the identified application has a fraudulent associated certificate (step 512), with the operation ending thereafter. If at step 504 the application fails to have an associated certificate, the validation mechanism provides an indication to the user that the identified application cannot be certified and, thus, may not be a trusted application (step 514), with the operation terminating thereafter.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for securely associating an application with a well-known entity. The illustrative embodiments detect whether an application has an associated certificate, such as a Secure Sockets Layer (SSL) certificate, Unified Communications (UC) certificate, or the like. If the application comprises a certificate, the illustrative embodiments verify whether the certificate is valid via a certificate authority of a well-known entity identified by the certificate. If the certificate is verified as being associated with the well-known entity and the well-known entity is a trusted entity, the illustrative embodiments provide an indication to the application user that the application is trusted and associated with the trusted entity, thus, the application may be trusted to handle certain URLs, e.g., those URLs associated with the trusted entity.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for securely associating an application with a well-known entity, the method comprising:

determining, by a processor of a validation mechanism in the data processing system, whether an identified application has an associated certificate;

responsive to the identified application having the associated certificate, determining, by the processor of the validation mechanism, whether the associated certificate is issued from a certificate authority associated with the well-known entity trusted by a user of the identified application by requesting validation of the associated certificate from the certificate authority indicated by the associated certificate establishing that the certificate authority in fact issued the certificate associated with the application, wherein the request for validation is sent by the processor of the validation mechanism via a cryptographic exchange through a network to the certificate authority, wherein the certificate authority is in a separate domain from an application marketplace where the application was obtained, and wherein a processor of the certificate authority responds via the cryptographic exchange to the validation mechanism with an indication of whether the certificate authority in fact issued the certificate associated with the application; and responsive to the associated certificate being issued by the certificate authority associated with the well-known entity trusted by the user of the identified application, providing, by the processor of the validation mechanism, an indication to the user that the application is trusted in context to interactions with the certificate authority.

2. The method of claim 1, further comprising:
providing, by the processor of the validation mechanism, an indication to the user of the well-known entity associated with the certificate authority validating the associated certificate.

3. The method of claim 1, further comprising:
responsive to the associated certificate failing to be issued by the certificate authority associated with the well-known entity trusted by the user of the identified application, providing, by the processor of the validation mechanism, an indication to the user that the application is not to be trusted.

4. The method of claim 1, further comprising:
responsive to the identified application failing to have the associated certificate, providing, by the processor of the validation mechanism, an indication to the user that the identified application cannot be certified and may not be a trusted application.

5. The method of claim 1, wherein determining whether the associated certificate is the valid certificate further comprises:
requesting, by the processor of the validation mechanism, validation of the associated certificate from a certificate authority indicated by the associated certificate, wherein the certificate authority responds with either an indication that the certificate is valid or the certificate is invalid.

6. The method of claim 1, wherein the indication is at least one of a notification, a pop-up, or integration onto a display along with the display of the identified application.

7. The method of claim 1, further comprising:
responsive to the associated certificate being valid and responsive to the identified application being downloaded by the user, storing, by the processor of the validation mechanism, an indication of the validation of the associated certificate to use in determining whether to allow the application to handle identified uniform resource locators (URLs).

8. The method of claim 7, wherein the identified URLs are associated with the certificate authority.

9. The method of claim 1, further comprising:
responsive to the associated certificate being valid and responsive to the identified application being downloaded by the user, storing, by the processor of the validation mechanism, user credentials associated with the user for utilization in connecting to and interacting with the well-known entity associated with a certificate authority that validated the associated certificate.

10. A computer program product compromising a non-transitory computer readable storage medium having a computer readable program stored therein, wherein the computer readable program, when executed on a computing device, causes the computing device to:
determine whether an identified application has an associated certificate;
responsive to the identified application having the associated certificate, determine whether the associated certificate is issued from a certificate authority associated with the well-known entity trusted by a user of the identified application by requesting validation of the associated certificate from the certificate authority indicated by the associated certificate establishing that the certificate authority in fact issued the certificate associated with the application, wherein the request for validation is sent by the processor of the validation mechanism via a cryptographic exchange through a network to the certificate authority, wherein the certificate authority is in a separate domain from an application marketplace where the application was obtained, and wherein a processor of the certificate authority responds via the cryptographic exchange to the validation mechanism with an indication of whether the certificate authority in fact issued the certificate associated with the application; and
responsive to the associated certificate being issued by the certificate authority associated with the well-known entity trusted by the user of the identified application, provide an indication to the user that the application is trusted in context to interactions with the certificate authority.

11. The computer program product of claim 10, wherein the computer readable program further causes the computing device to:
provide an indication to the user of the well-known entity associated with the certificate authority validating the associated certificate.

12. The computer program product of claim 10, wherein the computer readable program further causes the computing device to:
responsive to the associated certificate failing to be issued by the certificate authority associated with the well-known entity trusted by the user of the identified application, provide an indication to the user that the application is not to be trusted.

13. The computer program product of claim 10, wherein computer readable program further causes the computing device to:
responsive to the identified application failing to have the associated certificate, provide an indication to the user that the identified application cannot be certified and may not be a trusted application.

14. The computer program product of claim 10, wherein the computer readable program further causes the computing device to:
responsive to the associated certificate being valid and responsive to the identified application being downloaded by the user, store an indication of the validation of the associated certificate to use in determining whether to allow the application to handle identified uniform resource locators (URLs).

15. An apparatus comprising:
a processor; and
a memory coupled to the processor, wherein the memory comprises instructions which, when executed by the processor, cause the processor to:
determine whether an identified application has an associated certificate;
responsive to the identified application having the associated certificate, determine whether the associated certificate is issued from a certificate authority associated with the well-known entity trusted by a user of the identified application by requesting validation of the associated certificate from the certificate authority indicated by the associated certificate establishing that the certificate authority in fact issued the certificate associated with the application, wherein the request for validation is sent by the processor of the validation mechanism via a cryptographic exchange through a network to the certificate authority, wherein the certificate authority is in a separate domain from an application marketplace where the application was obtained, and wherein a processor of the certificate authority responds via the cryptographic exchange to the validation mechanism with an indication of whether the certificate authority in fact issued the certificate associated with the application; and
responsive to the associated certificate being issued by the certificate authority associated with the well-known entity trusted by the user of the identified application, provide an indication to the user that the application is trusted in context to interactions with the certificate authority.

16. The apparatus of claim 15, wherein the instructions further cause the processor to:
provide an indication to the user of the well-known entity associated with the certificate authority validating the associated certificate.

17. The apparatus of claim 15, wherein the instructions further cause the processor to:
responsive to the associated certificate failing to be issued by the certificate authority associated with the well-known entity trusted by the user of the identified application, provide an indication to the user that the application is not to be trusted.

18. The apparatus of claim 15, wherein the instructions further cause the processor to:
responsive to the identified application failing to have the associated certificate, provide an indication to the user that the identified application cannot be certified and may not be a trusted application.

19. The apparatus of claim 15, wherein the instructions further cause the processor to:
responsive to the associated certificate being valid and responsive to the identified application being downloaded by the user, store an indication of the validation of the associated certificate to use in determining whether to allow the application to handle identified uniform resource locators (URLs).

* * * * *